United States Patent [19]

Woehrl

[11] Patent Number: 5,226,598
[45] Date of Patent: Jul. 13, 1993

[54] NOZZLE WALL

[75] Inventor: Bernhard Woehrl, Gauting, Fed. Rep. of Germany

[73] Assignee: MTU Motoren- Und Turbinen-Union Munchen GmbH, Fed. Rep. of Germany

[21] Appl. No.: 881,342

[22] Filed: May 11, 1992

[30] Foreign Application Priority Data

May 10, 1991 [DE] Fed. Rep. of Germany ....... 4115403

[51] Int. Cl.$^5$ .......................... F02K 9/97; F02K 1/82; F02K 9/64
[52] U.S. Cl. ............... 239/127.1; 29/890.01; 60/267
[58] Field of Search .......... 239/127.1, 127.3; 60/267, 260; 29/890.01, 890.142

[56] References Cited

U.S. PATENT DOCUMENTS

| 3,127,737 | 4/1964 | Ledwith | 29/890.01 |
| 3,460,759 | 8/1969 | Gregory et al. | 239/127.1 |
| 3,690,103 | 9/1972 | Dederra et al. | 29/890.01 |
| 3,768,256 | 10/1973 | Butter et al. | 60/267 |
| 3,910,039 | 10/1975 | Fortini | 239/127.3 |
| 4,078,604 | 3/1978 | Christl et al. | 239/127.1 |
| 4,582,678 | 4/1986 | Niino et al. | 29/890.01 |

FOREIGN PATENT DOCUMENTS

| 0284410 | 6/1990 | European Pat. Off. . |
| 716175 | 12/1941 | Fed. Rep. of Germany . |
| 1273907 | 7/1968 | Fed. Rep. of Germany . |
| 3320557 | 2/1985 | Fed. Rep. of Germany . |
| 4015204 | 10/1991 | Fed. Rep. of Germany . |
| 1106916 | 8/1984 | U.S.S.R. . |

Primary Examiner—Gregory L. Huson
Assistant Examiner—Karen B. Merritt
Attorney, Agent, or Firm—Evenson, McKeown, Edwards & Lenahan

[57] ABSTRACT

A nozzle wall for two-dimensional (2D) hot gas nozzles of rocket or jet engines has a multilayer structure, in which a thermally conductive layer is flexibly connected to a support structure and a sliding layer is arranged between them to permit parallel movement of the thermally conductive layer. Also, a manufacturing method for the nozzle wall allows successive operations to be automatic to allow quality control inspections between these operations.

14 Claims, 2 Drawing Sheets

NOZZLE WALL

BACKGROUND AND SUMMARY OF THE INVENTION

The present invention relates to a rigid nozzle wall for expansion ramps and hot gas nozzles, comprising an outer support structure on the non-hot gas wetted side and a multilayer inner structure with spaced-apart cooling ducts on the hot gas wetted side, and a method for manufacturing such a nozzle wall so that the wall will largely remain free of distortion under operational conditions.

For reusable spaceplanes (e.g. the SÄNGER project), hybrid engines composed of diverse propulsion systems are envisaged. To obtain high thrust and facilitate switchover between engine types, two-dimensional (2D) nozzles of rectangular cross section have proved especially useful. The walls of such nozzles come under high compressive forces and temperatures. Such compressive forces cause high bending moments in the plane walls of 2D nozzles, unlike in the walls of circular nozzles. This may induce warping and straining in the nozzle and so jeopardize its proper function. The situation is aggravated by the bimetallic effect caused by differences in temperatures across the wall. To prevent thrust losses and leakage flows, therefore, dimensionally stable, cooled walls are needed.

DE-PS 40 15 204 discloses a multilayer nozzle wall, where an inner cooling layer is joined to an outer support structure through a cast-in intermediate layer. In this arrangement, temperature-induced elongations between the hot and cold sides cause undesirable warping of the layers.

It is a particular object of the present invention to provide an arrangement in which the inner structure consists of a hot-gas wetted thermally conductive layer and a heat-resistant sliding layer, the cooling ducts are imbedded in the thermally conductive layer and the thermally conductive layer is flexibly joined to the support structure through several fasteners extending through the sliding layer.

An advantage of the present invention is that by the flexible connection of the thermally conductive layer to the support structure, low-stress thermal expansion of the thermally conductive layer is ensured without permitting the differing layer temperatures to cause warping. Segregating the layers in this manner prevents warp-inducing shear stresses from being transferred between layers or from being generated at all. Transfer of the gas pressure forces is effected by the fasteners and by the sliding layer, which simultaneously forms a thermal barrier and protects the support structure from excessive temperatures.

The arrangement of the present invention also reduces the amount of coolant required for the cooling ducts in the thermally conductive layer. A plurality of fasteners simultaneously assures the thermally conductive layer conforms to the contour of the rigid support structure. To facilitate replacement of the thermally conductive layer when damaged, or for experimental purposes, the fasteners can be disengaged from the support structure, considering that the sliding layer is not fixedly connected to the adjacent layers.

In a preferred embodiment of the present invention the cooling ducts are formed by cooling tubes to enable the nozzle wall to be manufactured in a simple and low-cost manner.

In a further embodiment of the present invention, the fasteners are each connected in the thermally conductive layer to a cooling duct or tube so as to reliably and firmly mate the cooling layer to the support structure. To this end an especially advantageous arrangement is one in which the fasteners take the shape of hooks for improved anchorage in the thermally conductive layer. In this arrangement, the fasteners preferably envelope the cooling ducts.

In a presently preferred embodiment of the present invention the fasteners take the shape of bent ends of wire to facilitate manufacture and lower cost. In another presently preferred aspect of the present invention the fasteners are brazed to the support structure. This type of connection is easy to make and additionally facilitates replacement of the thermally conductive layer by heating the braze alloy to melting temperature and thereby permitting the fasteners to be detached from the support structure.

In yet a further embodiment of the present invention the sliding layer is made from a ceramic granular material to achieve favorable sliding properties at high-temperature resistance and concurrent thermal insulation relative to the support structure. This arrangement also facilitates manufacture in that the granular material can simply be filled into the space between the support structure and the thermally conductive layer.

In still a further preferred embodiment of the present invention the thermally conductive layer is made of oxygen-free copper to prevent reaction of the coolant, normally hydrogen, with the thermally conductive layer. Warping of the thermally conductive layer as a result of differing thicknesses of layer above and below the tubes can be prevented by dimensioning the layer, as measured radially above and below the cooling ducts, to be approximately the same.

In an alternative embodiment of the present invention the support structure is provided with webs to provide greater stiffness, especially bending stiffness of the nozzle wall.

In areas under high thermal load, as perhaps near the nozzle throat, it may also be necessary to provide added cooling capacity. In a further embodiment of the present invention, therefore, the cooling ducts branch out into several smaller ducts to reduce the heat transfer resistance, which largely determines the amount of heat being dissipated.

A novel method for manufacturing a nozzle wall having the above features and advantages is described herein and provides an advantage in that the successive process operations can be automated and allow quality inspection between operations.

BRIEF DESCRIPTION OF THE DRAWINGS

These and other objects, features and advantages of the present invention will become more apparent from the following detailed description of currently preferred embodiments when taken in conjunction with the accompanying drawings wherein.

DETAILED DESCRIPTION OF THE DRAWINGS

Figure 1:
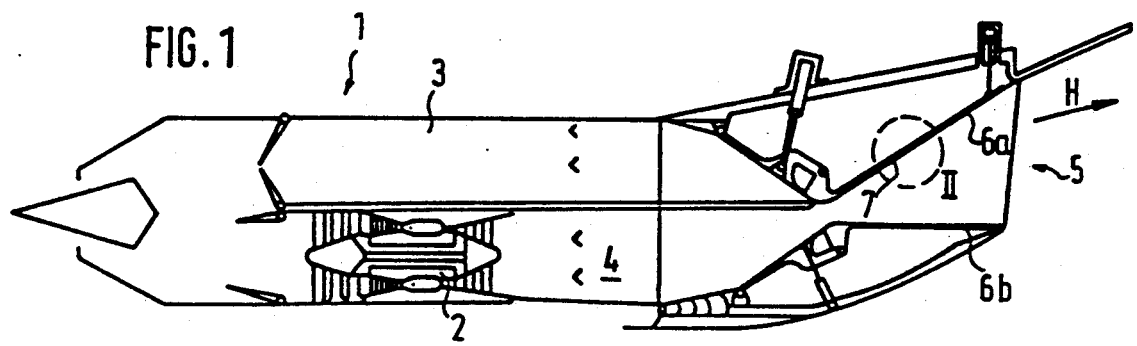
FIG. 1 is an elevational, cross-sectional schematic view of an integrated turbojet-ramjet engine with a variable 2D nozzle.

With reference now to FIG. 1, an integrated turbojet-ramjet engine designated generally by numeral comprises a gas turbine engine 2 having a compressor, combustion chamber and turbine, and arranged in parallel therewith, a ramjet engine 3. Downstream of the afterburners 4, the engine 1 has a rectangular sectional shape immediately followed by the exhaust nozzle 5. The nozzle 5 has two lateral nozzle walls (not shown for clarity), and two pair of nozzle flaps 6a, 6b to form the nozzle contour and vary the engine exhaust ducts.

Figure 2:
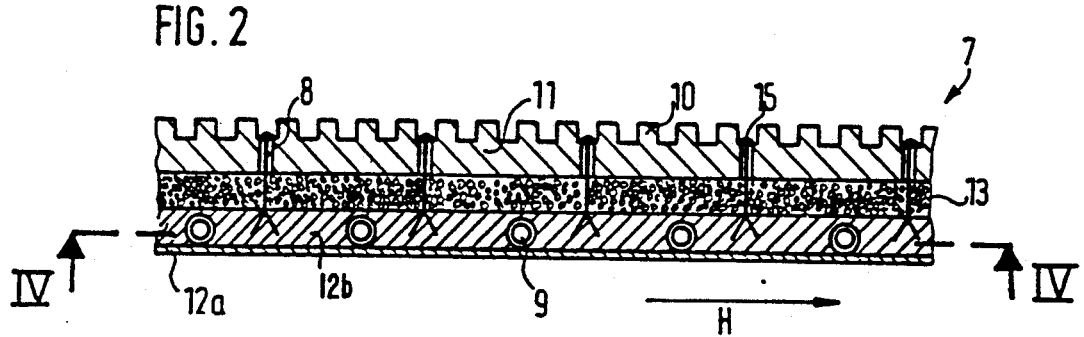
FIG. 2 is an enlarged cross-sectional view of a section of the nozzle shown in FIG. 1.

In FIG. 2, the nozzle wall 7 of the upper pair 6a of nozzle flaps is shown in an enlarged sectional view, from which can be seen the laminar configuration of the nozzle wall 7 with the hooks 8 and the cooling tubes 9. Extending between the upper support structure 11, which is stiffened via the webs 10, and the inner thermally conductive layer 12 wetted by the stream of hot gas H is a sliding layer 13 formed by a pressed-in ceramic granular material. This sliding layer 13 permits the support structure 11 to slide in a direction parallel with the thermally conductive layer 12 without transferring shear stresses. The thermally conductive layer 12 is attached to and made to conform to the contour of the support structure 11 by a plurality of hooks 8 anchored in the thermally conductive layer 12 between the cooling tubes 9 at their one end and are brazed in place in the support structure 11 at their other end.

To cool the nozzle wall 7, the cooling tubes 9 are imbedded in the thermally conductive layer 12 and are provided with liquid hydrogen as a coolant through a network of cooling tubes.

The thermally conductive layer 12a, b is shown in FIG. 2 as two layers to facilitate manufacture. During manufacture the cooling tubes 9 and the hooks 8 are positioned on the inner thermally conductive layer 12a, which is a thin copper plate, before the outer copper layer 12b is deposited by electroplating process.

Figure 3:
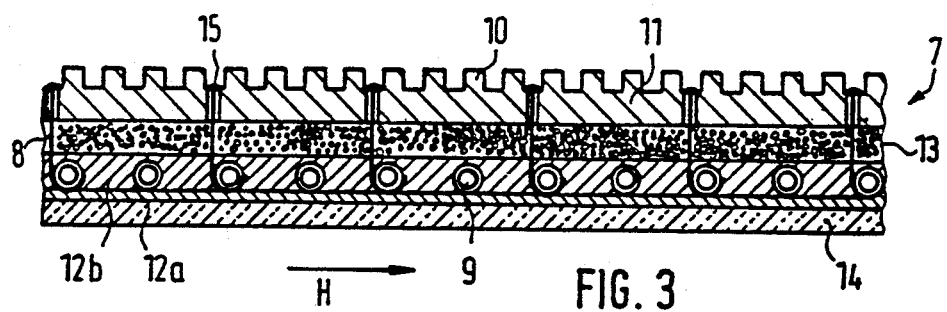
FIG. 3 is a view similar to FIG. 2 but illustrating an alternative embodiment of the nozzle wall.

FIG. 3 illustrates another embodiment of the nozzle wall 7, in accordance with the present invention, in which additionally a thermally insulating layer 14 is deposited on the hot-gas wetted side of the thermally conductive layer 12. Also, the hooks 8 are not anchored in the thermally conductive layer 12 independently of the cooling tubes 9, but envelope one cooling tube 9 each. In this arrangement, the hooks 8 are distributed to satisfy requirements with respect to stiffness, strength and conformance to the surface contour of the nozzle wall 7. To detach the support structure 11 from the remaining portions of the nozzle wall 7, the braze alloy 15 at the hooks 9 is simply melted.

Figure 4:
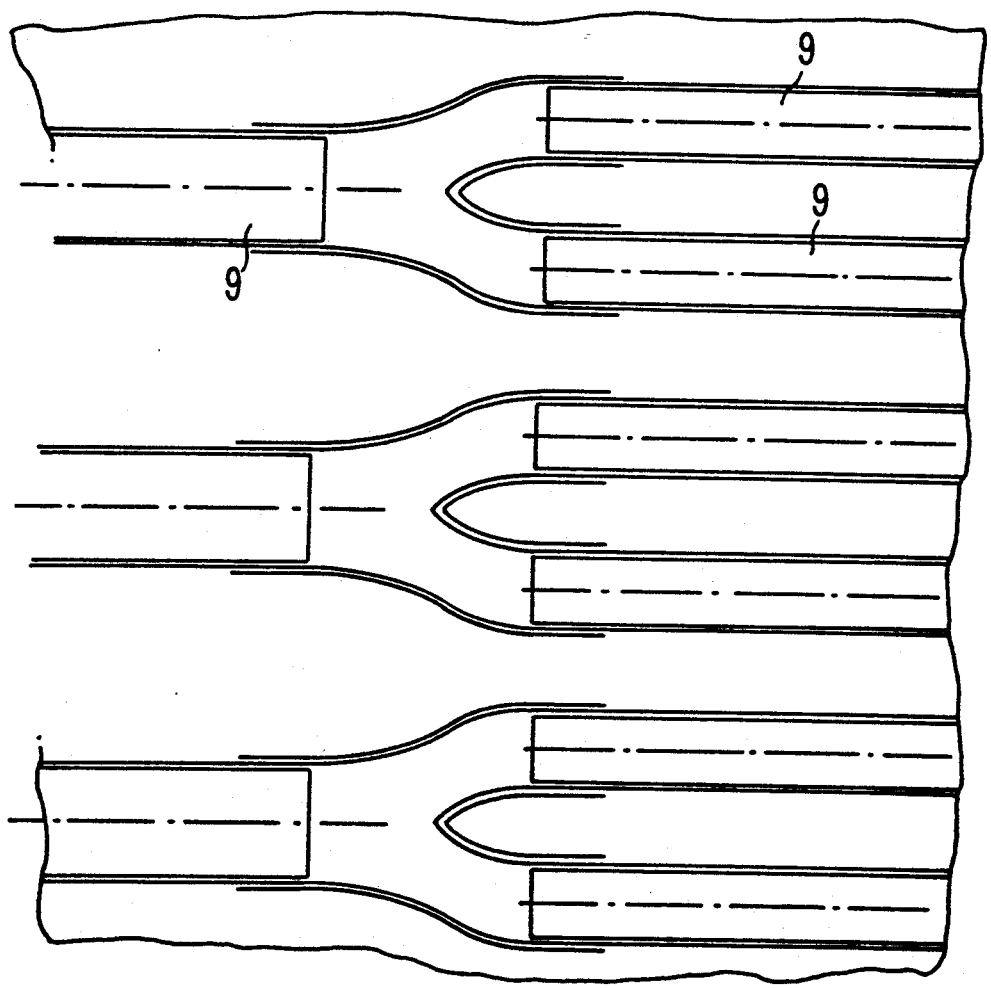
FIG. 4 is an enlarged cross-sectional view of a section the nozzle-wall's thermally conductive layer with branched cooling ducts as shown in FIG. 2.

The thermally conductive layer's 12 branched cooling tubes 9 are shown in FIG. 4. The branched network of cooling ducts will result in a better dissipation of heat. Therefore, the cooling tubes 9 branch out into several smaller tubes.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A nozzle wall for expansion ramps and hot gas nozzles, comprises a non-hot gas wetted outer support structure and a multilayer inner structure having spaced-apart cooling ducts on a hot-gas wetted side of the nozzle wall, wherein the inner structure includes a hot-gas wetted thermally conductive layer and a heat-resistant sliding layer, the cooling ducts are imbedded in the thermally conductive layer, and the thermally conductive layer is flexibly connected to the support structure by plural fasteners operatively extending through the sliding layer.

2. The nozzle wall according to claim 1, wherein the cooling ducts are cooling tubes.

3. The nozzle wall according to claim 1, wherein the fasteners in the thermally conductive layer are each connected to a cooling duct.

4. The nozzle wall according to claim 3, wherein the cooling ducts are cooling tubes.

5. The nozzle wall according to claim 1, wherein the fasteners comprise hooks.

6. The nozzle wall according to claim 1, wherein the fasteners at least partially envelope the cooling ducts.

7. The nozzle wall according to claim 1, wherein the fasteners have bent wire ends.

8. The nozzle wall according to claim 1, wherein the fasteners are brazed to the outer support structure.

9. The nozzle wall according to claim 1, wherein the sliding layer comprises a ceramic granular material.

10. The nozzle wall according to claim 1, wherein the thermally conductive layer is comprised of oxygen-free copper material.

11. The nozzle wall according to claim 1, wherein a thickness of the thermally conductive layer, as measured radially above and below the cooling ducts, is approximately the same.

12. The nozzle wall according to claim 1, wherein the outer support structure is provided with stiffening webs.

13. The nozzle wall according to claim 1, wherein individual cooling ducts branch out into several cooling ducts of smaller cross-sectional area.

14. A method for manufacturing a nozzle wall for expansion ramps and hot gas nozzles, in which the wall comprises a non-hot gas wetted outer support structure and a multilayer inner structure having spaced-apart cooling ducts on a hot-gas wetted side of the nozzle wall, in the inner structure includes a hot-gas wetted thermally conductive layer and a heat-resistant sliding layer, the cooling ducts are imbedded in the thermally conductive layer, and the thermally conductive layer is flexibly connected to the support structure by plural fasteners operatively extending through the sliding layer, comprising the steps of attaching the hooks to the cooling tubes in a spaced-apart arrangement, locating the cooling tubes with the hooks on a thin copper plate comprising the thermally conductive layer, electrodepositing a copper layer comprising the thermally conductive layer on the side of the thin copper plate provided with the cooling tubes, where the height of the thin copper layer is at least equal to the diameter of the tubes, inserting the hooks into openings in the outer support structure so as to keep a certain distance between the outer support structure and the thermally conductive layer, brazing the hooks to the outer support structure in the openings, and filling the space between the thermally conductive layer and the outer support structure with a ceramic granular material to form the heat-resistant sliding layer.

* * * * *